(No Model.)
A. FERBER.
MILK BUCKET.
No. 567,679. Patented Sept. 15, 1896.
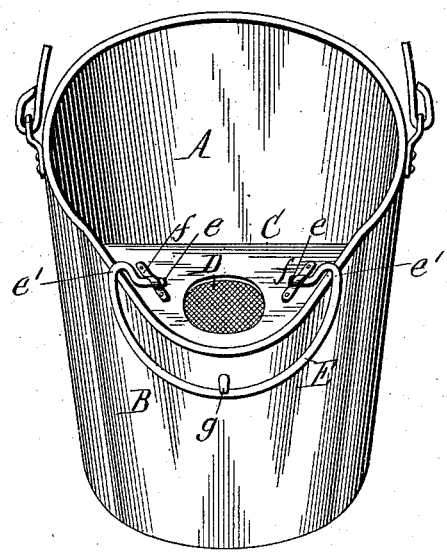
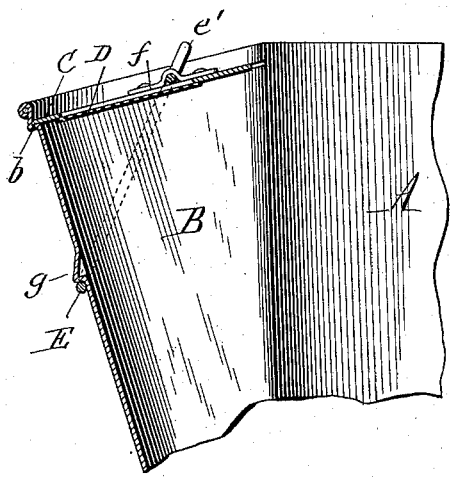
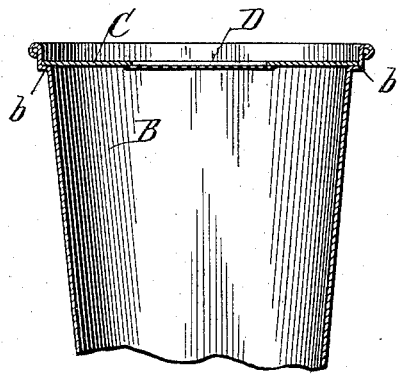
WITNESSES:
Chas. F. Burkhardt
Henry L. Deck
Anthony Ferber  INVENTOR.
By Wilhelm Bonner
ATTORNEYS.

UNITED STATES PATENT OFFICE.

ANTHONY FERBER, OF BUFFALO, NEW YORK, ASSIGNOR TO THE SIDNEY SHEPARD & COMPANY, OF SAME PLACE.

MILK-BUCKET.

SPECIFICATION forming part of Letters Patent No. 567,679, dated September 15, 1896.

Application filed August 30, 1895. Serial No. 560,951. (No model.)

*To all whom it may concern:*

Be it known that I, ANTHONY FERBER, a citizen of the United States, residing at Buffalo, in the county of Erie and State of New York, have invented new and useful Improvements in Milk-Buckets, of which the following is a specification.

This invention relates to milk-buckets and similar vessels having a strainer which is removably secured to the lip or spout of the vessel to facilitate the cleaning of the strainer and permit a number of such vessels to be nested or placed one within another for compact storage or shipment.

My invention has for its object to provide the strainer with a simple and inexpensive fastening which securely holds it in place and permits its ready removal from the vessel.

In the accompanying drawings, Figure 1 is a perspective view of a milk-bucket provided with my improvement. Fig. 2 is a fragmentary vertical section of the same on an enlarged scale. Fig. 3 is a transverse vertical section of the lip or spout at right angles to Fig. 2.

Like letters of reference refer to like parts in the several figures.

A represents the bucket or vessel, and B its lip or spout, which may be of any suitable form, and which is provided near its upper edge with an internal ledge or shoulder $b$.

C is the strainer plate or frame, which rests upon the shoulder of the lip or spout. This plate is shaped to conform to the inner walls of the spout, so as to form a close joint therewith, and is provided with an opening, which is covered with wire cloth or gauze D, forming the strainer.

E is a bail or bow whereby the strainer-plate is removably held upon the supporting-shoulder of the vessel. This bail is pivoted to the upper side of the strainer-plate, on opposite sides of its opening, by clips or bearings $f$, which receive the end portions or pivots $e$ of the bail. These end portions are bent substantially at right angles to the side portions of the bail, so as to allow the bail to swing freely toward and from the adjacent front side of the vessel.

$g$ is a nose or projection which is arranged on the front side of the spout and under which the middle portion of the bail is engaged, as shown in Figs. 1 and 2, thereby retaining the strainer-plate upon its supporting-shoulder. The inclined upper face of the nose $g$ facilitates the engagement of the bail under the abrupt face of the nose in locking it. The bail is formed on the outer sides of its pivots, above the walls of the spout, with upward bends or indentations $e'$, whereby it clears the upper edges of said walls. These bends also increase the elasticity of the bail and enable it to be more easily interlocked with and disengaged from the nose of the spout. The nose is so arranged with reference to the bail that the latter must be sprung or forced under it, whereby the bail is more securely interlocked with the nose.

To release the strainer-plate, the bail is simply seized on opposite sides of the nose of the spout and pulled out of engagement with the nose, whereupon the plate can be removed from the spout.

The portion of the lip above its shoulder extends upward directly from the outer edge of the shoulder, as shown in Figs. 2 and 3, thereby avoiding the formation of a crease or groove, in which impurities are liable to lodge, and enabling the shoulder to be thoroughly cleaned.

I claim as my invention—

The combination with a pail or vessel having an open-topped spout and a supporting ledge or shoulder within the upper portion of said spout and a projection on its front side below the top of said spout, of a strainer-plate resting on said ledge or shoulder and provided with a hinged bail which can be swung down over said spout and engaged under said projection or nose, substantially as set forth.

Witness my hand this 27th day of August, 1895.

ANTHONY FERBER.

Witnesses:
CARL F. GEYER,
JNO. J. BONNER.